Figure 1:
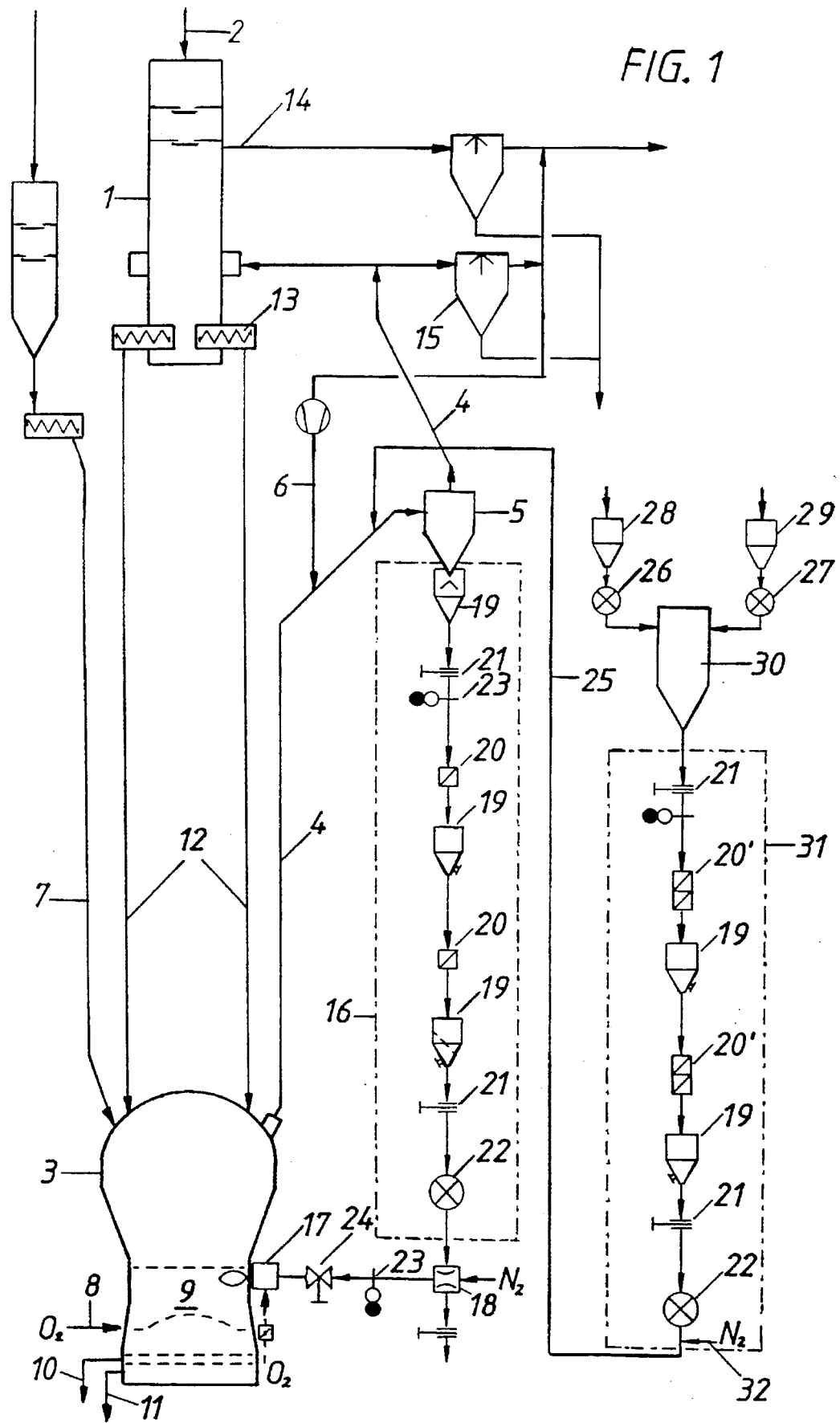

United States Patent [19]

Kepplinger et al.

[11] Patent Number: 5,567,379
[45] Date of Patent: Oct. 22, 1996

[54] METHOD OF PRODUCING MOLTEN PIG IRON OR MOLTEN STEEL PRE-PRODUCTS AND A PLANT THEREFOR

[75] Inventors: Leopold W. Kepplinger, Leonding; Panajiotis Matzawrakos; Johannes Schenk, both of Linz; Dieter Siuka, Neuhofen, all of Austria

[73] Assignees: Voest-Alpine Industrieanlagenbau GmbH, Linz, Austria; Pohang Iron & Steel Co., Ltd.; Research Institute of Industrial Science & Technology, Incorporated Foundation, both of Pohang, Rep. of Korea; a part interest

[21] Appl. No.: 449,761

[22] Filed: May 25, 1995

Related U.S. Application Data

[62] Division of Ser. No. 66,505, May 20, 1993, Pat. No. 5,445,668.

[30] Foreign Application Priority Data

May 21, 1992 [AT] Austria ................................. 1054/92

[51] Int. Cl.[6] ..................................................... C21B 7/00
[52] U.S. Cl. ............................ 266/143; 266/160; 266/182
[58] Field of Search ........................... 266/142, 143, 266/182, 160; 75/491, 961

[56] References Cited

U.S. PATENT DOCUMENTS

| 4,784,689 | 11/1988 | Vuletic | 266/160 |
|---|---|---|---|
| 4,921,532 | 5/1990 | Corbett et al. | 266/182 |
| 5,445,668 | 8/1995 | Kepplinger et al. | 75/491 |

Primary Examiner—Scott Kastler
Attorney, Agent, or Firm—Hopgood, Caliamfde, Kalil & Judlowe

[57] ABSTRACT

A plant is provided for producing molten pig iron or molten steel pre-products from lumpy, iron-ore-containing charging substances. The plant comprises a reduction shaft furnace for receiving lumpy, iron-ore-containing charging substances, the plant including a melter gasifier for receiving the reduction product formed in the reduction shaft furnace. The plant also includes a first charging device for at least one of iron ore and ore dust and a second charging device for solid carbon carriers, the melter gasifier being provided with a device for flow-connecting the first charging device for at least one of iron ore and ore dust and the second charging device for charging carbon carriers to at least one dust burner.

12 Claims, 4 Drawing Sheets

METHOD OF PRODUCING MOLTEN PIG IRON OR MOLTEN STEEL PRE-PRODUCTS AND A PLANT THEREFOR

This is a division of application Ser. No. 08/066,505, filed May 20, 1993, now U.S. Pat. No. 5,445,668.

The invention relates to a method of producing molten pig iron or molten steel pre-products from lumpy, iron-ore-containing charging substances which are reduced in a reduction shaft furnace by means of a reducing gas, wherein the reduced iron particles obtained are melted in a melter gasifier under supply of coal and oxygen-containing gas under simultaneous formation of the reducing gas, and the reducing gas is supplied to the reduction zone of the shaft furnace, as well as to a plant for carrying out the method.

A method of this type as well as a plant for carrying out this method are known from EP-B-0 010,627, AT-B-378,970 as well as AT-B-381,116. The special advantage of such a method is that the use of iron-containing material of a very wide size spectrum, in particular in the range between 10 and 30 mm, as well as the use of carbon carriers of widely varying carbon contents are possible without complex measures, and that a sufficient energy supply is ensured without the danger of a simultaneous re-oxidation of the charge. Even coals having high ash contents and high portions of volatile components may be used without any problems.

From AT-B-381,116 it is known to provide for an additional heat supply for the melter gasifier by burning coal particles separated from the reducing gas, if non-metallurgical coal is being used.

The present invention has as its object to further develop the above-described method in so far that also fine ore and/or ore just, such as oxidic iron fine dust incurred in a metallurgical plant, can be used, i.e. preferably in an amount corresponding to from 20 to 30% of the normal oxidic iron charge of the above-described method.

According to the invention, this object is achieved in that in addition to the charging substances fine ore and/or ore dust, such as oxidic iron fine dust incurred in a metallurgical plant, is used, the fine ore and/or the ore dust being supplied with solid carbon carriers to at least one dust burner working into the melter gasifier and being reacted in a substoichiometric combustion reaction.

What is essential in this connection is that combustion in the dust burner is effected such that no components interfering with the process are formed, i.e. it must be ensured that the combustion reaction proceeds substoichiometrically according to the chemical equation

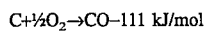

and not according to the equation

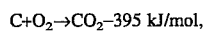

because the $CO_2$ is undesired for the reduction of the oxidic Fe dusts. The CO forming subsequently merges into the process gas and the liquefied dust particles merge into the slag or into the pig iron bath of the melter gasifier. For this purpose operation of the burner must be adjusted such that the molar oxygen-fuel ratio, $O_2$ to C here, is more than 0.5, preferably is 0.6.

The method according to the invention allows for the processing of all iron fine ores, as they are incurred during transportation and otherwise in a metallurgical plant, and an agglomeration, which hitherto has been common, can be obviated.

An advantageous variant of the method according to the invention is characterised in that the reducing gas is cooled and dedusted and that the dust separated from the reducing gas is returned into the melter gasifier via the dust burner commonly with the fine ore or the ore dust and the solid carbon carriers.

To obtain a thorough mixing and pre-heating and a pre-reduction of the mixture of fine ore with carbon carriers, according to a preferred embodiment the fine ore or the ore dust is charged into the unpurified reducing gas obtained from the melter gasifier and pre-heated and pre-reduced in the latter, whereupon the fine ore or the ore dust is separated commonly with the dust of the reducing gas from the latter and is supplied to the dust burner.

Suitably, the solid carbon carriers are added to the reducing gas commonly with the fine ore or the ore dust.

Another advantageous variant is characterised in that the solid carbon carriers are supplied directly to the dust burner, which results in a slighter influence on the recycling of the dusts separated from the reducing gas to the melter gasifier.

To eliminate such an influence entirely, advantageously the fine ore or the ore dust is directly supplied to the dust burner commonly with the solid carbon carriers.

To obtain a thorough mixing of the fine ore with the carbon carriers and with the dusts separated from the reducing gas without substantially influencing the system which separates the dusts, according to a preferred embodiment the fine ore or the ore dust is commonly supplied with the solid carbon carriers to the dust burner, together with the dust separated from the reduction gas, via a pressure compensation sluice system preceding the dust burner.

To prevent degassing products from forming in the system separating the dusts from the reducing gas, advantageously coke is used as the solid carbon carrier.

When directly supplying the carbon carriers to the dust burner, suitably coal, in the method according to claim 1 in particular coal dust incurred is used as the solid carbon carrier.

A plant for carrying out the method
with a reduction shaft furnace for lumpy iron ore and
with a melter gasifier to receive the reduction product formed in the reduction shaft furnace,
is characterised in that a fine ore or ore dust charging means as well as a charging means for solid carbon carriers are flow-connected with at least one dust burner or the melter gasifier.

A preferred embodiment is characterised in that a gas duct carrying off reducing gas from the melter gasifier is provided with a cyclone and enters into the reduction shaft furnace, the cyclone being in flow connection with the dust burner of the melter gasifier via a sluice system, a dust conveying device, such as an injector, and via a conveying duct, and wherein a charging duct originating from the fine ore or ore dust charging means enters into the gas duct which is provided between the melter gasifier and the cyclone, and wherein advantageously the charging means for solid carbon carriers is in flow-connection with the charging duct for fine ore or ore dust.

Another suitable embodiment is characterised in that a separate charging duct originates from the charging means for solid carbon carriers and enters directly into the conveying duct which connects the dust conveying device with the dust burner.

A further advantageous embodiment is characterised in that a gas duct carrying off reducing gas from the melter gasifier is provided with a cyclone and enters into the reduction shaft furnace, wherein the cyclone is in flow connection with the dust burner of the melter gasifier via a sluice system, a dust conveying device, such as an injector, and via a conveying duct, and wherein a charging duct common to the fine or or the ore dust charging means and the charging means for carbon carriers enters into the sluice system between the cyclon and the dust burner.

Advantageously, a gas duct carrying off reducing gas from the melter gasifier is provided with a cyclone and enters into the reduction shaft furnace, wherein the cyclone is in flow-connection with the dust burner of the melter gasifier via a sluice system, a dust conveying device, such as an injector, and via a conveying duct, and wherein a charging duct common to the fine ore or ore dust charging means and the charging means for carbon carriers enters into the conveying duct between the dust conveying device and the dust burner.

Figure 2:
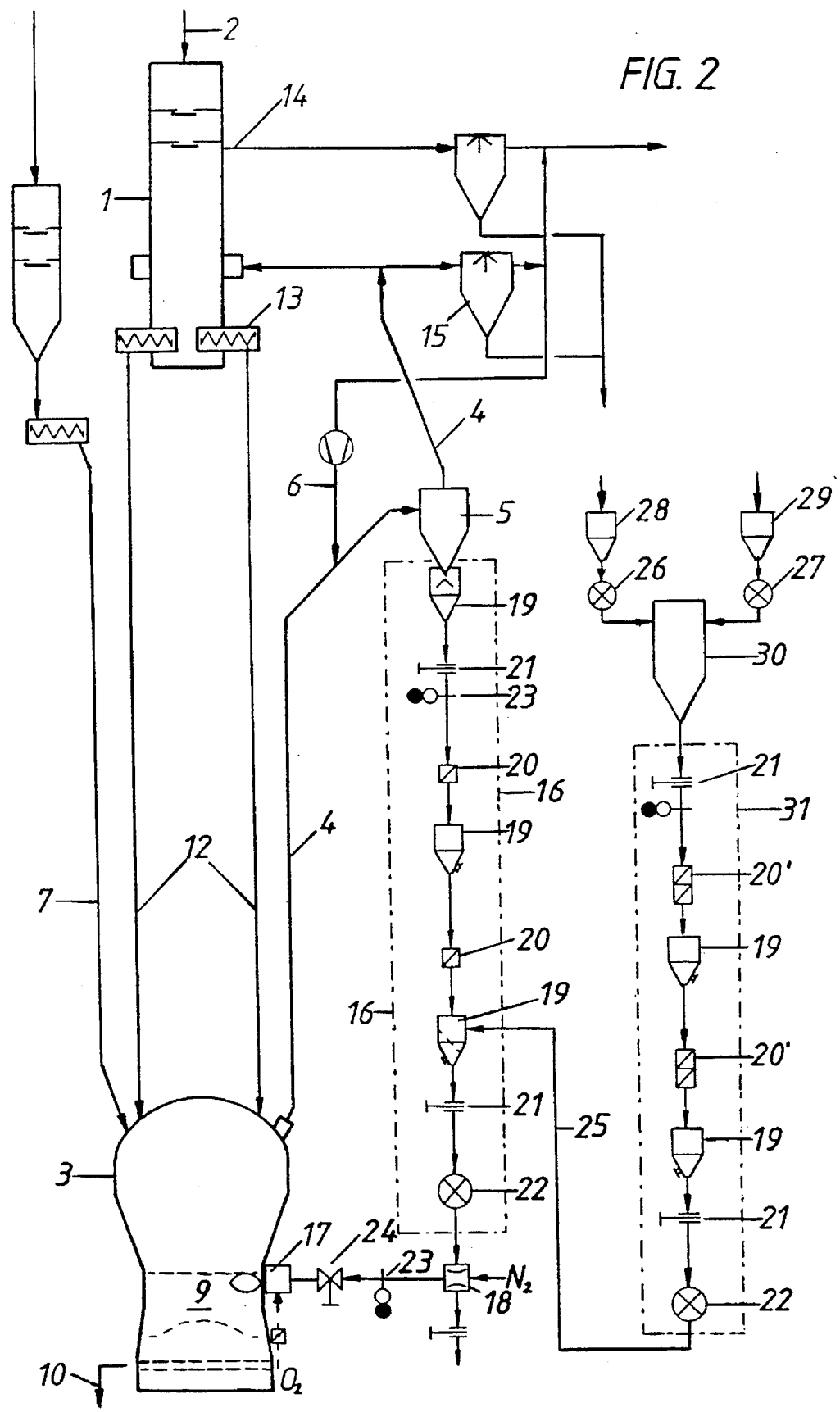
Figure 3:
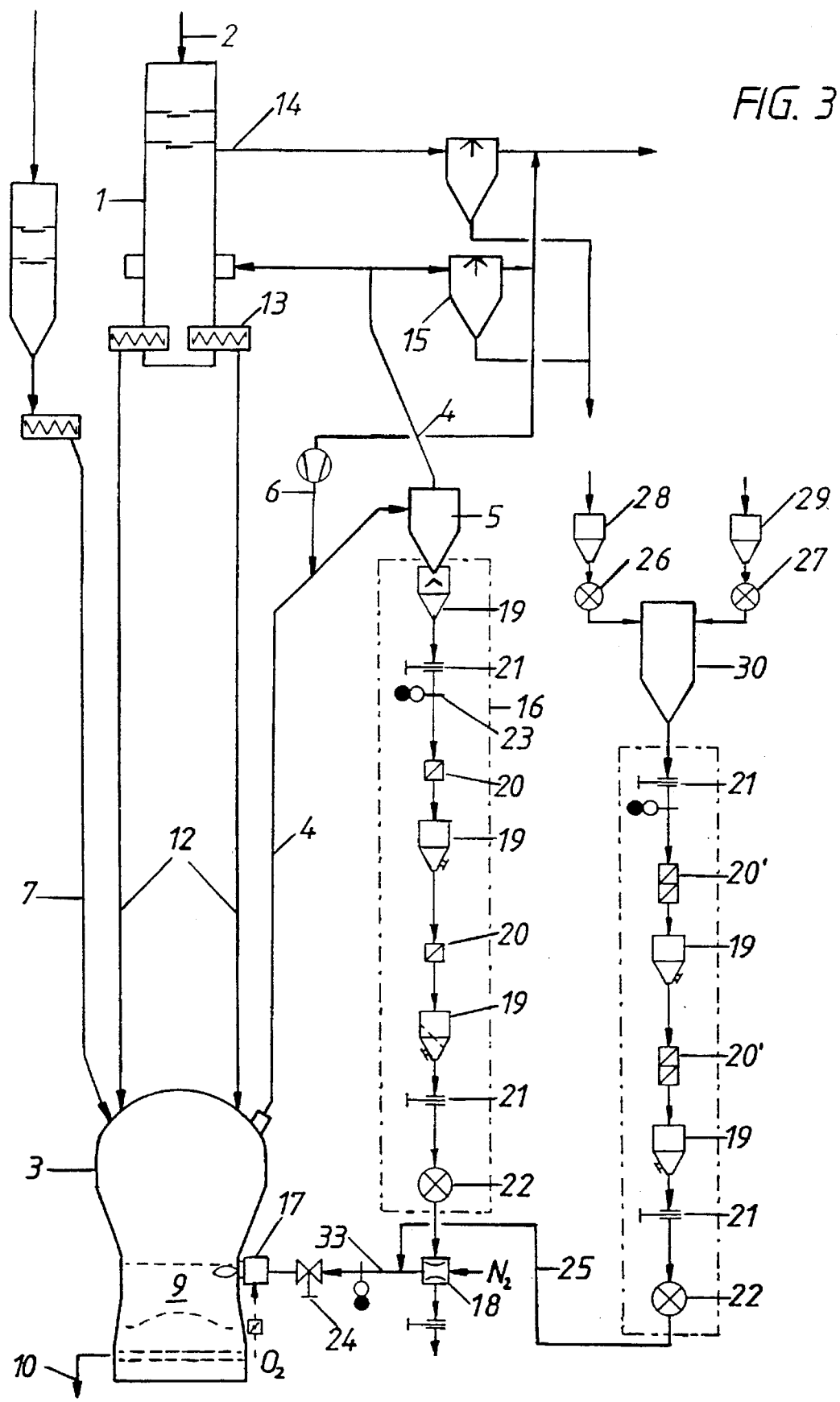
Figure 4:
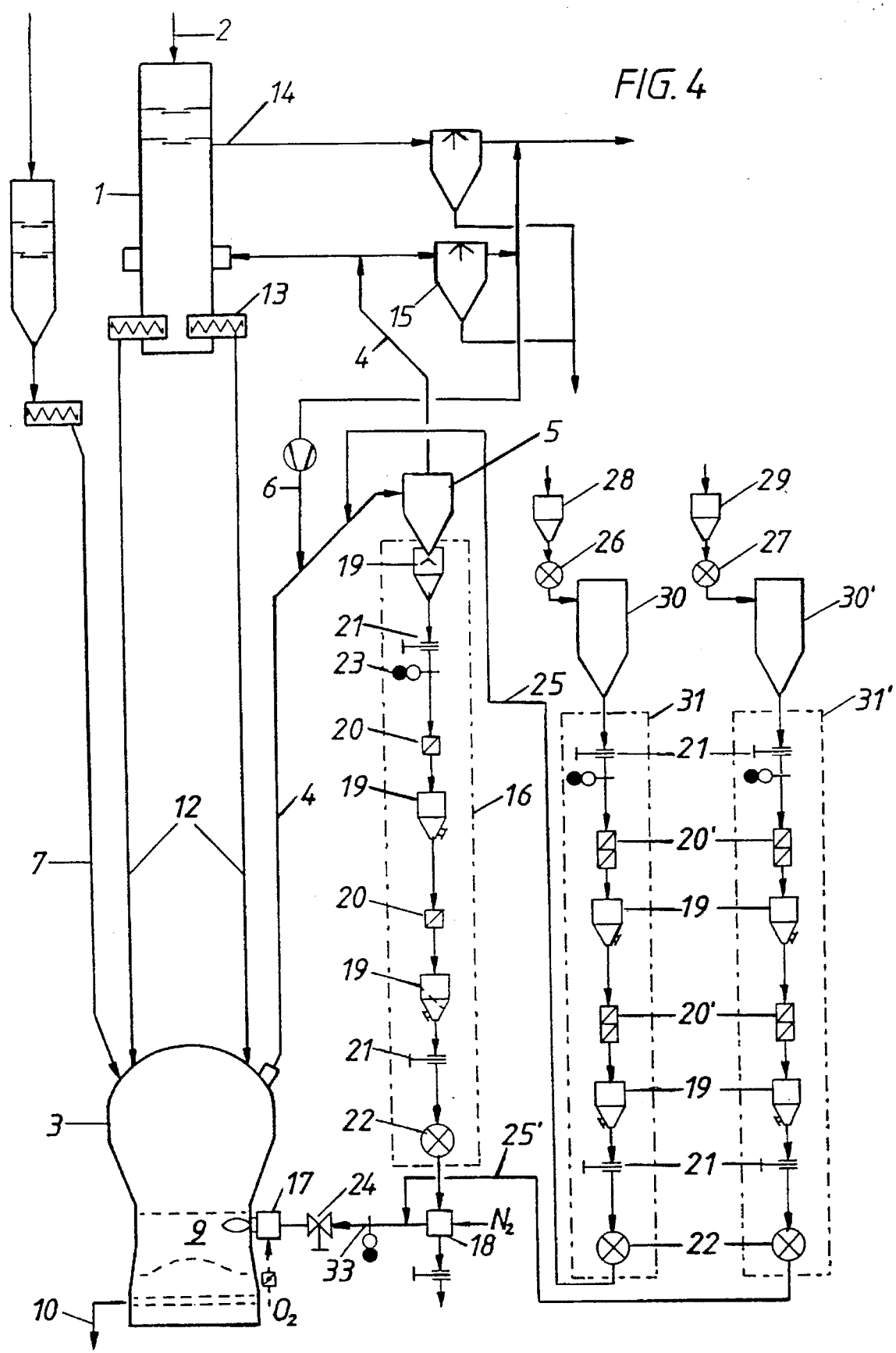

The invention will now be explained in more detail by way of several exemplary embodiments illustrated in the drawings, wherein FIG. 1 is a schematical illustration of a plant for carrying out the method of the invention according to a first embodiment, and FIGS. 2, 3 and 4 show further embodiments in analogous illustrations.

A reduction means designed as a shaft furnace is denoted by 1, into whose reduction zone lumpy iron oxide-containing charging substances, possibly together with fluxes., are top-charged via a supply duct 2. The shaft furnace 1 is connected with a melter gasifier 3, in which a reducing gas is produced from carbon carriers and an oxygen-containing gas, which reducing gas is supplied to the shaft furnace 1 via a gas duct 4 and which rises in counterdirection to the flow of the sinking iron ore and causes the reduction of the iron ore. In the gas duct 4, a gas purification means 5 is provided, which is designed as a hot gas cyclone. To cool the reducing gas, a cooling gas duct 6 enters into the gas duct 4, before the gas duct 4 enters into the hot gas cyclone 5.

The melter gasifier 3 comprises a supply means 7 for solid, lumpy carbon carriers, and a supply duct 8 for an oxygen-containing gas. Within the melter gasifier 3, molten slag and molten pig iron collect below the meltdown gasifying zone 9, which are tapped separately via one separate tap 10, 11, each, or via a common tap 10', as illustrated in FIGS. 2, 3 and 4.

The lumpy ore which has been reduced in the shaft furnace 1 in the reduction zone thereof, is supplied to the melter gasifier 3 commonly with the fluxes burned in the reduction zone via ducts 12 which connect the shaft furnace 1 with the melter gasifier 3, for instance by means of discharge worms 13. To the upper part of the shaft furnace 1, an off-duct 14 for the top gas forming in the reduction zone thereof is connected. Part of the reducing gas is fed as cooling gas in the gas duct 4 after having passed a gas purification means 15.

Via a sluice system 16, the dust separated in the hot gas cyclone 5 is transported to at least one dust burner 17 on the melter gasifier 3, via an injector 18 operated by nitrogen gas. The sluice system 16 serves to overcome the pressure difference between the hot gas cyclone 5 and the dust burner 17, i.e. between a zone of lower pressure in the hot gas cyclone 5 and a zone of higher pressure at the dust burner 17. It is formed by dust containers 19 and slides 20 arranged between the dust containers 19—the slides being gas- and material-tight closure means, flat slides 21 as well as at least one dosing means, e.g. a cellular wheel sluice 22 and a stop plug 23. Between the injector 18 and the dust burner, furthermore a ball valve 24 and a further stop plug 23 are provoded.

According to the embodiment illustrated in FIG. 1, a mixture of coke dust and fine ore and/or ore dust is supplied via a charging duct 25 into the gas duct 4 provided between the melter gasifier 3 and the hot gas cyclone 5, mixing, pre-heating and pre-reduction of the supplied mixture taking place in the hot gas cyclone which then works as a reduction cyclone. Due to the use of coke dust, the formation of degasing products in the sluice system 16 is avoided. The fine ore and/or the ore dust as well as the coke dust are each supplied via separate cellular wheel sluices 26, 27 from storage containers 28, 29 to a common mixing bunker 30, from which the mixture is fed into the gas duct 4 via a sluice system 31 comprised of flat slides 21, dust containers 19 and intermediately arranged pressure sluice flaps 20' arranged in the charging duct as well as a further dosing means 22.

A nitrogen supply duct 32 entering into the charging duct 25 is provided downstream of the further dosing means 22, e.g. a cellular wheel sluice. By aid of the sluice system 31, the pressure difference between the mixing bunker 30 and the gas duct 4 is overcome.

The mixture supplied from the hot gas cyclone 5 to the dust burner 17 is reacted by aid of this dust burner 17 in a substoichiometric combustion reaction. The CO forming therein merges with the reducing gas. The dust particles melting on account of the combustion heat get into the slag or into the pig iron bath.

According to the embodiment illustrated in FIG. 2, the charging duct 25 enters into the sluice system 16 provided between the hot gas cyclone 5 and the dust burner 17, i.e. into the last dust container provided in this sluice system 16. This variant is particularly advantageous if larger amounts of fine ore are to be charged, wherein influence on the hot cyclone 5 is avoided.

According to the embodiment illustrated in FIG. 3, the charging duct 25 enters into the duct 33 between the injector 18 and the dust burner 17, which duct 33 leads from the injector to the dust burner, whereby also an influence on the operation of the hot cyclone 5 is avoided. The particular advantage of this variant is to be seen in that coal dust may be used instead of coke dust, since degassing of the coal only occurs in the melter gasifier and cannot lead to an obstruction of the dust return in the hot gas cyclone 5 or in the sluice system 16.

According to the embodiment illustrated in FIG. 4, the fine ores and/or the ore dust are charged, separately from the coal dust, into the gas duct 4 leading into the hot gas cyclone 5 via a charging duct 25, and the coal dust is charged separately therefrom into duct 33 leading from the injector 18 to the gas burner 17, via a spearate charging duct 25', a separate sluice system 31, 31' being provided in each charging duct 25, 25' so that an adaptation to the different pressures of gas duct 4 and duct 33 is feasible. In this case the advantage of the reduction of the ore dust in the hot gas cyclone can be combined with the advantage of coal charging, so that here, like in the variant illustrated in FIG. 3, use of the coal dust incurred in the plant from coal sieving and from the dedusting plant of coal drying is possible.

By the following example, the method according to the variant illustrated in FIG. 1 is explained in more detail:

The analysis of the dust in the reducing gas at the exit of the melter gasifier was as follows (in % by weight):

| | |
|---|---|
| Fe | 31.8% |
| C | 50.5% |
| CaO | 3.0% |
| MgO | 0.8% |
| $SiO_2$ | 8.3% |

-continued

| | |
|---|---|
| $Al_2O_3$ | 5.6% |

The dust content of the reducing gas was 150 g/m³ (at normal conditions).

The analysis of the fine ore used (moist values) for ore from San Isidoro, Brazil, is listed in the following table (in % by weight).

| | |
|---|---|
| $Fe_2O_3$ (Fe) | 92.02% (64,41%) |
| CaO | 0.09% |
| MgO | 0.05% |
| $SiO_2$ | 1.16% |
| $Al_2O_3$ | 0.47% |
| MnO | 0.05% |
| Annealing losses | 2.85% |
| Humidity | 3.08% |
| Balance, other substances | 0.32% |

The core size distribution of the fine ore was (in % by weight)

| | |
|---|---|
| <20 μm | 2% |
| 20–63 μm | 16% |
| 125–63 μm | 35% |
| 250–125 μm | 39% |
| >250 μm | 8% |

Fine ore in a portion of 30% by weight of the total Fe-charge was charged and melted.

Analysis of the coke used was as follows (in % by weight):

| | |
|---|---|
| C | 97.2% |
| H | 0.12% |
| N + O | 1.71% |
| S | 0.97% |
| $C_{fix}$ | 88.1% |
| Ash portion | 11.3% |

The pre-reduction of the fine ore in the gas duct 4 and in the hot cyclone 5 amounted to 53% by weight. For the reduction in the dust burner 17, 50 kg of coke and 311 m³ (at normal conditions) $O_2$ per t of fine ore were used.

9.3 t of pig iron/h could be produced at an overall ore charge of 14.8 t/h. The pig iron produced in the melter gasifier 3 had the following components (in % by weight), besides iron:

| | |
|---|---|
| C | 3.9–4.2% |
| Si | 0.4–0.6% |
| P | 0.012% |
| Mn | 0.1% |
| S | 0.04–0.06% |

At the same fine ore charge, coal is charged instead of coke in the variant illustrated in FIG. 4.

Analysis of the coal charged:

| | |
|---|---|
| C | 81.4% |
| H | 4.8% |
| N | 1.4% |
| O | 5.8% |
| S | 0.5% |
| $C_{fix}$ | 62.9% |
| Ash portion | 6.2% |

The coal consumption was 376 kg, and the $O_2$-consumption was 460 N³ m per t of fine ore.

9.1 t of pig iron/h could be produced at an overall ore charge of 14.5 t/h. The pig iron produced in the melter gasifier had the following components, besides iron:

| | |
|---|---|
| C | 3.9–4.2% |
| Si | 0.4–0.6% |
| P | 0.01% |
| Mn | 0.1% |
| S | 0.04–0.06% |

What we claimed is:

1. A plant for producing molten pig iron or molten steel pre-products from lumpy, iron-ore-containing charging substances of the type including a reduction shaft furnace for said lumpy, iron-ore-containing charging substances, and a melter gasifier for receiving the reduction product formed in said reduction shaft furnace, the improvement comprising a first charging means for at least one of iron ore and ore dust, a second charging means for solid carbon carriers, at least one dust burner provided at said melter gasifier, means for flow-connecting said first charging means for said at least one of iron ore and ore dust and said second charging means for said solid carbon carriers with said at least one dust burner.

2. A plant as set forth in claim 1, further comprising a gas duct carrying off reducing gas from said melter gasifier and entering into said reduction shaft furnace, a cyclone provided in said gas duct, a sluice system preceding said at least one dust burner and flow-connected with said cyclone, a dust conveying device flow-connected to said sluice system, a conveying duct flow-connected with said dust conveying device and with said at least one dust burner, a charging duct departing from said first charging means for said at least one of fine ore and ore dust and entering into said gas duct provided between said melter gasifier and said cyclone.

3. A plant as set forth in claim 2, wherein said dust conveying device is an injector.

4. A plant as set forth in claim 2, further comprising duct means flow-connecting said second charging means for said solid carbon carriers with said charging duct for said at least one of said fine ore and ore dust.

5. A plant as set forth in claim 2, further comprising a separate charging duct departing from said second charging means for said solid carbon carriers and entering directly into said conveying duct connecting said dust conveying device with said at least one dust burner.

6. A plant as set forth in claim 1, further comprising a gas duct carrying off reducing gas from said melter gasifier and entering into said reduction shaft furnace, a cyclone provided in said gas duct, a sluice system preceding said at least one dust burner and flow-connected with said cyclone, a dust conveying device flow-connected with said sluice system, a conveying duct flow-connected with said dust conveying device and with said at least one dust burner, a charging duct common to both said first charging means for said at least one of fine ore and ore dust and said second charging means for said solid carbon carriers, entering into said sluice system provided between said cyclone and said at least one dust burner.

7. A plant as set forth in claim 1, wherein said dust conveying device is an injector.

8. A plant as set forth in claim 1, further comprising a gas duct carrying off reducing gas from said melter gasifier and entering into said reduction shaft furnace, a cyclone provided in said gas duct, a sluice system preceding said at least one dust burner and flow-connected with said cyclone, a dust conveying device flow-connected with said sluice system, a conveying duct flow-connected with said dust conveying device and with said at least one dust burner, a charging duct common to both said first charging means for said at least one of fine ore and ore dust and said second charging means for said solid carbon carriers, entering into said conveying duct provided between said dust conveying device and said at least one dust burner.

9. A plant as set forth in claim 8, wherein said dust conveying device is an injector.

10. A plant as set forth in claim 2, 6 or 8, further comprising a further sluice system provided in said charging duct.

11. A plant as set forth in claim 10, wherein said further sluice system provided in said charging duct comprises at least one pressure sluice flap and a dust container.

12. A plant as set forth in claim 11, wherein said further sluice system comprises a flat slide.

* * * * *